UNITED STATES PATENT OFFICE.

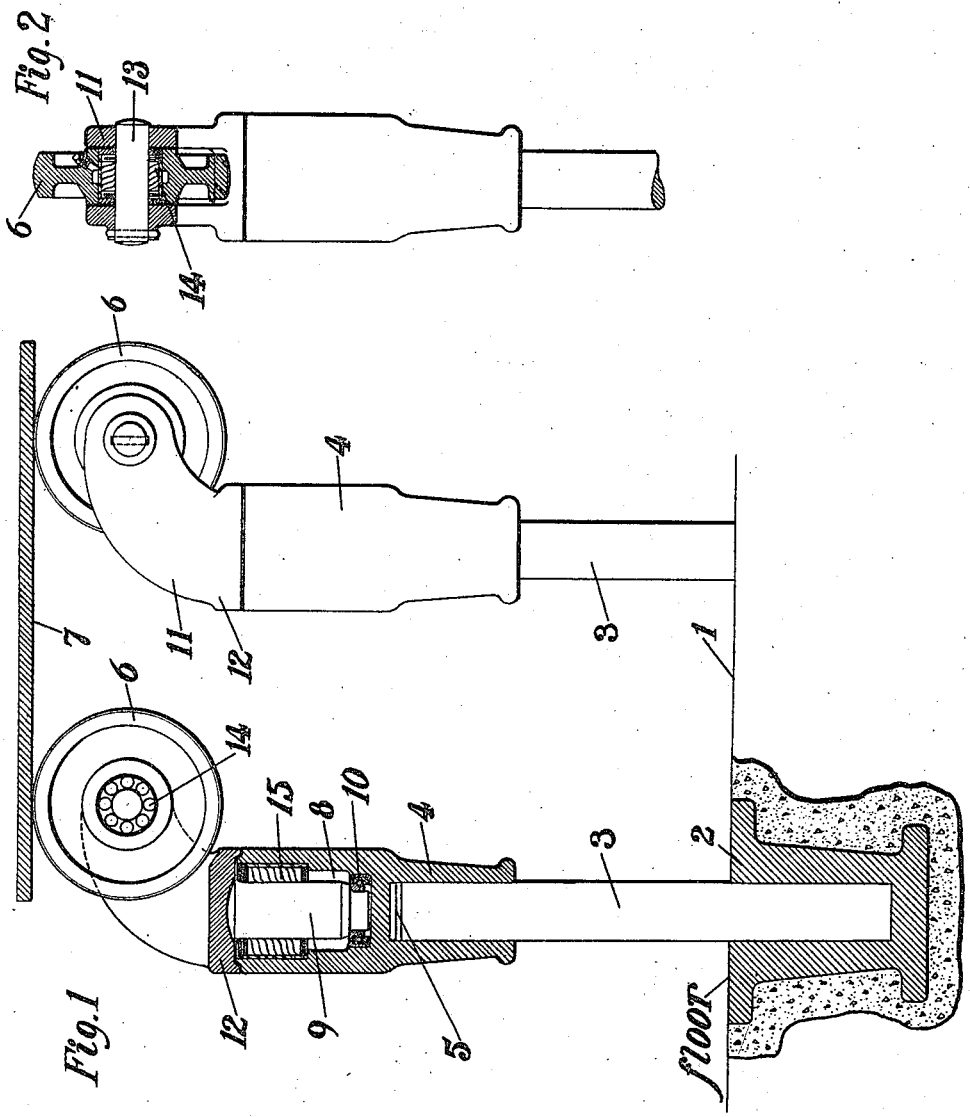

ERIK W. MIKAELSON, OF EASTON, PENNSYLVANIA, ASSIGNOR TO TREADWELL ENGINEERING COMPANY, A CORPORATION OF PENNSYLVANIA.

CASTER-TABLE.

1,322,808.  Specification of Letters Patent.  Patented Nov. 25, 1919.

Application filed January 7, 1919. Serial No. 270,093.

*To all whom it may concern:*

Be it known that I, ERIK W. MIKAELSON, a citizen of the United States, and a resident of Easton, in the county of Northampton of Easton, in the county of Northampton and State of Pennsylvania, have invented certain new and useful Improvements in Caster-Tables, of which the following is a specification.

This invention relates to caster tables such as are used in rolling mills or plate shops for handling large plates wherein it is desired to support the plate on a large number of casters so that it can be readily shifted in various directions from one place to another, such for example as between different shears or drill presses.

The object of the invention is to improve the construction and mounting of the casters whereby they will turn more easily and operate for long periods without attention. In a medium sized mill there may be two thousand or more casters arranged in one or more tables, and it is desirable to reduce the amount of care which these devices require, since the number to be taken care of increases the cost of material and labor involved. The common construction at present is to provide the caster with a socket which is simply placed loosely on top of a rod fastened in the floor. This construction is unsatisfactory for several reasons among which may be mentioned the difficulty of lubrication, since the oil tends to run out of the bottom of the socket as fast as it is put in at the top, and also because there is no provision for adjusting the height of individual casters so that all of those in a table will be of the same height. These caster tables are subjected to very hard and rough usage, and in mills as now equipped, the time of one or more men is continuously required to oil these casters and to make daily adjustments for height due largely to improper lubrication. Adjustment for height is commonly made by inserting shims or washers between the end of the stationary rod and the top of the inverted socket in the caster, but this form of adjustment immediately begins to wear down and the weight on the casters tends to squeeze the lubricant out. Efforts to retain the lubricant by means of packings are unsatisfactory not only because of the additional cost but also because of the increased wear and attention required.

By this invention a caster table is provided with a socket for the purpose of holding the lubricant and to preferably receive anti-friction bearings between the caster spindle and socket, provision for adjustment of height being provided by the insertion of shims between the end of the rod and the stationary socket and thereby not subjected to wear.

In the accompanying drawings,

Figure 1 is an elevation partly in section of a caster table embodying the invention, and Fig. 2 is a sectional view showing the mounting of the caster wheel.

1 represents a floor having inserted therein cast iron sockets 2 in which are frictionally inserted vertical rods 3 frictionally carrying at their upper ends the caster sockets 4, washers as 5 being interposed between the end of the rod 3 and the socket 4 for adjusting the height so that all of the casters 6 will come at the same height and properly support the plate 7. Each caster socket 4 is provided with a recess 8 whose primary function is to contain the lubricant, and in the recess 8 is inserted the caster spindle 9, which preferably bears on a thrust ball bearing 10 at the bottom and a cage type of roller bearing 15 at the side.

The spindle 9 is connected to the caster 11, the base of which as 12 forms a cap over the socket 4, which keeps out dirt. The oil is put in by simply withdrawing the caster spindle, and when once put in will last indefinitely without requiring any attention. The caster wheel 6 is pivoted in the yoke 11 on a pin 13, and preferably on a cage roller bearing 14 as shown, it being seen that the caster wheel is eccentric to the axis of the spindle 9 so that the caster will turn as the plate 7 is shifted around.

By this invention a material saving in maintenance is effected, especially in installations embodying several thousand of these devices, because instead of requiring attention every day, as in previous constructions, with much waste of oil, caster tables embodying this invention can be used for an indefinite time without requiring attention or re-adjustment for height. While the socket 4 could be pinned to the rod 3, this is not found necessary since the caster turns in the socket more easily than the caster and socket turn on the rod, so that the leveling shims 5 do not wear.

What is claimed, is:

1. In combination with a floor, a support journaled therein, said support carrying a socket, an oil recess in said socket, a caster having its spindle journaled in said oil recess and a cap for said recess.

2. In a caster table, in combination with a floor carrying a support, an oil retaining socket borne by said support, means for adjusting the height of said socket on said support and a caster having its spindle journaled in said socket.

3. In a caster table, in combination with a support, a socket adjustable as to height on said support, an oil retaining recess in said socket, a caster having its spindle journaled in said oil recess in a side anti-friction bearing and a bottom anti-friction thrust bearing and a cap covering said oil recess.

Signed at Easton, in the county of Northampton and State of Pa., this 4th day of November, A. D. 1918.

ERIK W. MIKAELSON.